United States Patent [19]

Ehsani-Nategh et al.

[11] Patent Number: 5,657,021
[45] Date of Patent: Aug. 12, 1997

[54] SYSTEM AND METHOD FOR RADAR-VISION FOR VEHICLES IN TRAFFIC

[75] Inventors: Shahrokh Ehsani-Nategh, Rome; Shahmir S. Ehsani-Nategh, Genoa, both of Italy

[73] Assignee: Ehsani Engineering Enterprises, Inc., Kanata, Canada

[21] Appl. No.: 378,466

[22] Filed: Jan. 26, 1995

[30] Foreign Application Priority Data

Jun. 30, 1994 [CA] Canada ................................ 2127160
Nov. 7, 1994 [CA] Canada ................................ 2135215

[51] Int. Cl.$^6$ ................................................ G01S 13/12
[52] U.S. Cl. ................................ 342/70; 342/189
[58] Field of Search .......................... 342/70–72, 189

[56] References Cited

U.S. PATENT DOCUMENTS

| | | | |
|---|---|---|---|
| 3,680,100 | 7/1972 | Woerrlein .................... | 342/198 |
| 3,790,938 | 2/1974 | Anderson et al. ............ | 342/198 |
| 3,887,918 | 6/1975 | Bailey et al. ................ | 343/17.2 |
| 4,019,185 | 4/1977 | Morgan ....................... | 343/17.2 R |
| 4,044,356 | 8/1977 | Fournier ...................... | 343/17.2 |
| 4,051,472 | 9/1977 | Albanese ..................... | 343/5 |
| 4,069,888 | 1/1978 | Wolters et al. .............. | 180/98 |
| 4,203,113 | 5/1980 | Baghdady ................... | 342/198 |
| 4,281,412 | 7/1981 | Wissel et al. ................ | 375/86 |
| 4,394,628 | 7/1983 | Banks ......................... | 332/19 |
| 4,449,127 | 5/1984 | Sanchez ...................... | 343/7 |
| 4,566,010 | 1/1986 | Collins ........................ | 343/17.2 |
| 4,697,186 | 9/1987 | Rock ........................... | 342/189 |
| 5,008,678 | 4/1991 | Herman ...................... | 342/158 |
| 5,173,706 | 12/1992 | Urkowitz ..................... | 342/99 |
| 5,268,692 | 12/1993 | Grosch et al. ................ | 342/70 |
| 5,389,932 | 2/1995 | Ota et al. .................... | 342/189 |
| 5,400,037 | 3/1995 | East ............................ | 342/372 |
| 5,455,847 | 10/1995 | Guilford et al. .............. | 375/373 |
| 5,467,072 | 11/1995 | Michael ....................... | 340/436 |
| 5,481,268 | 1/1996 | Higgins ....................... | 342/70 |
| 5,497,160 | 3/1996 | Koehler et al. .............. | 342/145 |
| 5,576,666 | 11/1996 | Rauvola ...................... | 331/25 |

OTHER PUBLICATIONS

IEEE Dictionary, definition for "attenulation," p. 60 1984.
Radar System Analysis, David K. Barton, The Artech Radar Library, pp. 192–203 1976.
Radar Handbook, Merrill I. Skolnik, McGraw-Hill, pp. 5–6–5–11 and 5–38–5–43 1970.

*Primary Examiner*—Michael J. Carone
*Assistant Examiner*—Christopher K. Montgomery
*Attorney, Agent, or Firm*—Thomas R. Vigil

[57] ABSTRACT

A plurality of substantially interference-free radar systems, each comprising: means for generating pseudorandom waveforms for sequential transmission by radar; and a radar transmitting and receiving phased array antenna having a horizontal beamangle of a few milli-radians (mR), and a vertical beamangle of about 25 mR.

8 Claims, 7 Drawing Sheets

200 mV    5ns

SYSTEM AND METHOD FOR RADAR-VISION FOR VEHICLES IN TRAFFIC

BACKGROUND OF THE INVENTION

1. Field of the Invention

The present invention is directed generally to the field of radar, and in particular to a radar system with improved interference characteristics. More particularly, the radar system belongs to the category known as "low probability of interception—low probability of exploitation" (LPI-LPE) radar. More particularly still, the preferred field of application of the present system is in the field of vehicular traffic on the ground and on roads, where fog and the like conditions obstruct normal vision. But it is, of course, also applicable to other situations; for example, for boat traffic in harbours, rivers and canals. The system is based on phased-array, monostatic limited scan volumetric radar. The intended radar range is between zero and a few hundred meters.

2. Prior Art of the Invention

Radar systems using phased-array antennae are well known, for example as in systems known as "side looking airborne radar" (SLAR), where carefully shaped radar beams permit imaging of the ground underneath an aircraft in flight. In such and similar systems, interference from other radars is not a problem. And while such systems could, in principle, be used to permit "vision-less" driving in normal vehicular traffic on roads on the ground, in practice this would only be possible where few vehicles were thus equipped each having well separated radar frequencies. As soon as indeterminate or significant numbers of vehicles are involved the problem of interference becomes intractable.

The known closest prior art to the present invention is disclosed in European Patent Application No. 92100969.2 published as No. 0 501 135 A2 on Sep. 2, 1992 entitled "Broad-band mobile radio link for high-volume transmission in an environment with multiple reflectors". U.S. patent application Ser. No. 07/823,534 filed Jan. 21, 1992, now U.S. Pat. No. 5,375,144, by Sharokh EHSANI et al corresponds to the said published European patent application. Both applications are incorporated herein by reference, where permitted.

In the above referenced European and United States patent application, which are particularly suitable for mobile radio/data links, the problems of interference are mitigated by providing two orthogonalities between different vehicle signals. The first orthogonality being that of code-division multiple access (CDMA), and the second being a small frequency separation. These techniques improve radio/data communications links under high-density usage conditions, but would not be sufficient to permit safe and reliable "radar-vision" to drivers in road traffic, or the like applications.

A further patent of interest is U.S. Pat. No. 5,031,193 granted Jul. 9, 1991 to Frederick G. ATKINSON et al, and entitled "Method and apparatus for diversity reception of time-dispersed signals". The patent teaches as follows:

A method and apparatus for diversity reception in a communication system wherein at least a dual branch receiver is provided with a stored replica of expected reference information that is correlated with the received time-dispersed signals to obtain an estimate of the transmission channel's impulse response as seen by each branch, and determine, among other things, phase error between the branch local oscillators and the time-dispersed signals. Matched filters are constructed which then coherently align the time-dispersed signals from each branch with that branch's local oscillator, also constituting the first part of the equalization. The diversity processing stage may perform bit by bit selection on the re-aligned signals, maximal ratio combining of the re-aligned signals, or equal gain combining of the re-aligned signals, following each by a sequence estimation which uses similarly selected or combined channel distortion compensation parameters to complete the equalization process on the new signal. In digital modulated carrier systems, providing expected reference information eliminates the need for carrier recovery feedback for each branch while performing part of the equalization process.

Thus, this United States patent stores a replica of expected reference information and correlates it with actually received information to provide an estimate of the equalization necessary in the diversity receive channel to permit better reception of unexpected information.

An earlier U.S. Pat. No. 4,291,410, granted Sep. 22, 1981 to Edgar L. CAPLES et at, is entitled "Multipath diversity spread spectrum receiver". The patent discloses a multipath diversity receiver utilizing decision directed coherent integration with post detection correlation techniques.

U.S. Pat. Nos. 5,031,193 and 4,291,410 are incorporated herein by reference, where permitted.

In a recent article in the "New Scientist" (15 Oct. 1994, No. 1947) titled "CARS THAT DRIVE THEMSELVES" it is stated (page 38)"

"Controlling the car's speed is more difficult. The major challenge is building a sensor that can monitor the precise distance of the vehicle ahead and its closing speed, over a range of 100 meters to less than 1 meter. Such a sensor must be able to detect everything in the lane ahead while ignoring vehicles in other lanes. It must work accurately in all weathers and be reasonably cheap to build. 'We thought the aerospace industry might have all the answers, but even military radars cannot, do all the things we need,'... For the moment researchers make do with hand-built radars, but they work only when the vehicle ahead is a few meters away."

SUMMARY OF THE INVENTION

The present invention utilizes monostatic phased-array antennas to advantage. In addition to well known advantages (cf. S. Drabowitch et F. Gauthier "Antennes-Reseauz Phasees: des principes aux Realisations", Revue Technique Thomson—CSF, Mars 1980), other advantages are:

variable dwell time;
  flexible beam shaping for transmission, reception or both;
  use of leakage canceller correlation loop;
  use of limited scan with attendant significant cost reduction (cf. J. M. Howell: Limited Scan Antennas, IEEE AP-5, Inf. Symp. 1972); and
  antenna can be made conformal.

The phased-array antenna with the limited scan, narrow beam shape, provides an additional signal orthogonality to curtail interference.

In a broad aspect of the present system, radar in a mobile vehicle is used in combination with roads equipped with radar reflectors (e.g. Luneberg lenses), which mark road-limits, to provide radar-vision in conditions where natural vision is destructed without interference from other vehicles' radars.

In another aspect, interference from other radar equipped vehicles is curtailed by the implementation of three signal orthogonalities provided by:

(a) code-division multiple access (CDMA);

(b) small frequency separation (Δf); and (c) an angle-of-arrival (A-o-A) defining very narrow beam phased-array antenna.

In yet another aspect, the (vehicular) radar receivers utilizes autocorrelation to detect and identify the reflected waveform echo.

Preferably, and where possible, the radar antenna is positioned at or near the windshield of the vehicle. Further, a passive (or also active) rear antenna is used to enable computation of an estimate of distance and relative speed of rear vehicles.

BRIEF DESCRIPTION OF THE DRAWINGS

The preferred embodiment of the present invention will now be described in conjunction with the annexed drawings, in which:

FIG. 3a depicts the output of the correlator, or matched filter, when the IF signal applied to it is an echo of the signal radiated by the particular radar system;

FIG. 3b is a photograph of an actual test result of the output shown in FIG. 3a;

DESCRIPTION OF THE PREFERRED EMBODIMENT

Figure 1:
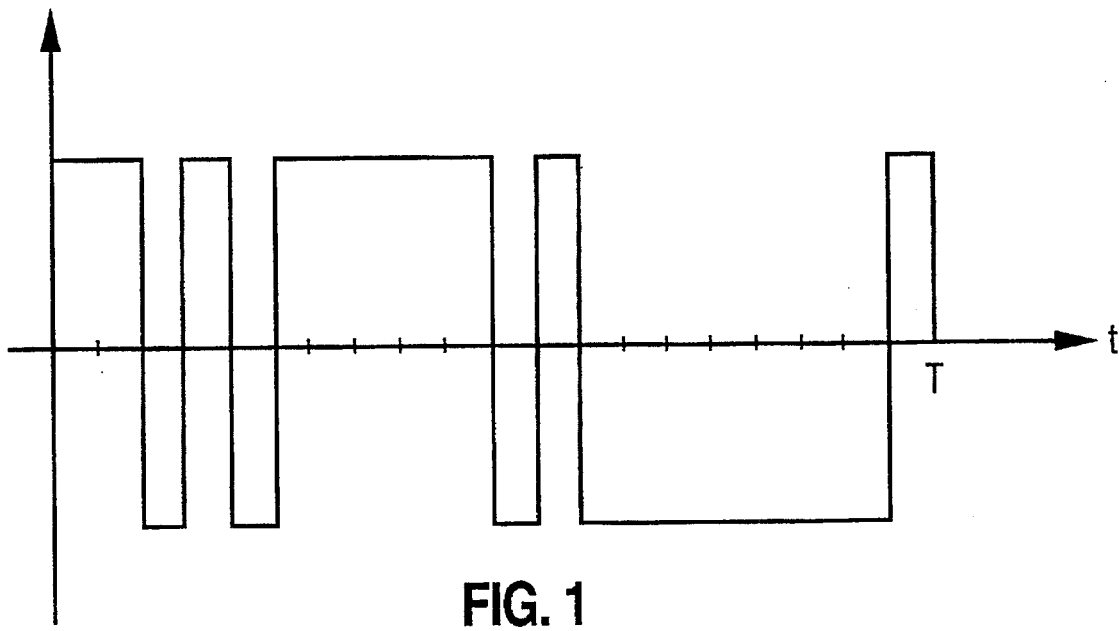
FIG. 1 is an example of a pseudorandom, direct sequence-code division multiple access (DS-CDMA) waveform generated in the radar system of the present invention.

The preferred radar system of the present invention utilizes three orthogonalities, as mentioned earlier, in order to curtail interference from other vehicles' radar systems. The first (time-waveform) orthogonality is provided by the computational generation of direct sequence (DS-CDMA) pseudo-random code sequences. An example of an arbitrary code waveform of duration T is shown in FIG. 1 of the drawings. These sequentially generated pseudorandom code waveforms should have: a duty cycle close to unity (greater than 0.95); constant power; and a nearly flat power density spectrum (PDS). The flat PDS assures, in reception, time resolution between echoes close to the Heisenberg limit.

The time-waveform orthogonality means that out-of-phase autocorrelation of an arbitrary code waveform is negligible compared to the in-phase autocorrelation; and that cross-correlating with any phase, of any two members of the CDMA universe is also negligible compared to in-phase autocorrelation. In the frequency domain, for this family of CDMA code waveforms, the in-phase autocorrelation is obtainable as Parseval's integral. Thus, a shift in frequency equal to 1/T should yield zero for in-phase autocorrelation (Parseval's integral); for example, given a T=100 microseconds, a shift in frequency (Δf) by a mere 10 kHz would (still) yield zero for in-phase autocorrelation (thereby curtailing interference). In practice, assuming T=100 microseconds and Δf=500 kHz (at, say, a radar carrier frequency of 70 GHz), the level of an interfering signal as given by $$\frac{\sin \pi \cdot \Delta f \cdot T}{\pi \cdot \Delta f \cdot T}$$

would be less than −44 dB. This is adequate frequency domain orthogonality. Of course, interference levels decrease as a Δf and T increase.

Figure 2:
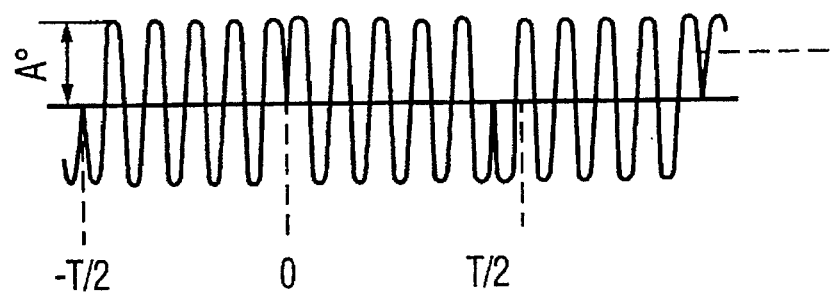
FIG. 2 is an example of the intermediate frequency (IF) output of a segment of the received radar signal echo, which is input to a reception correlator in the radar system.
Figure 3:
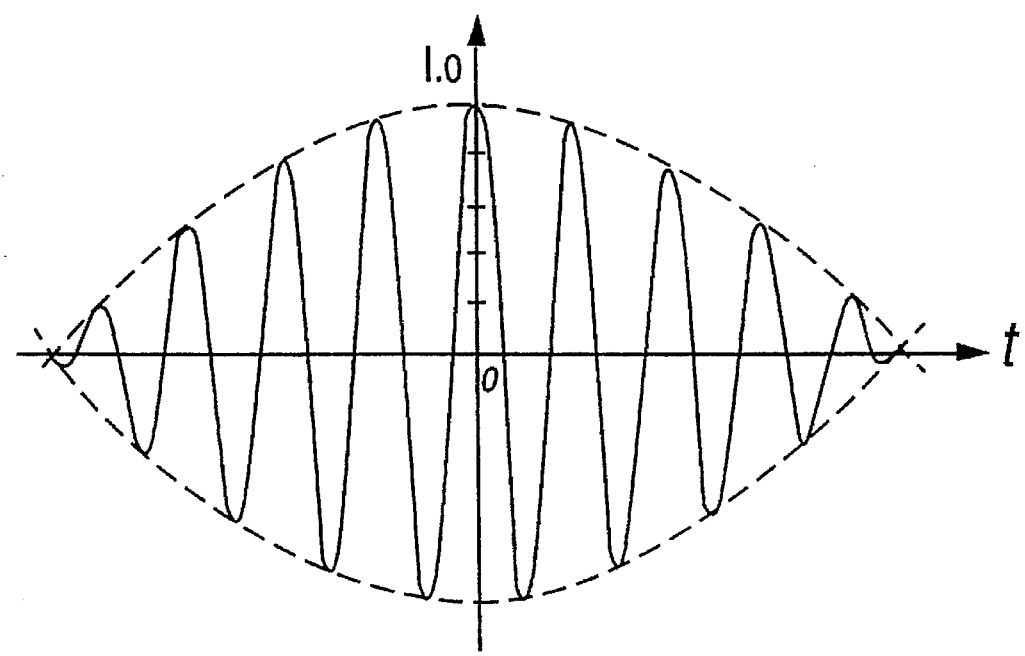
Figure 3:
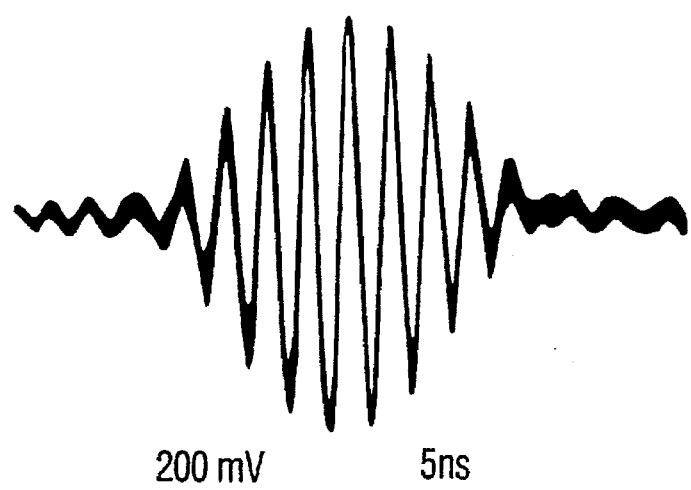

As the echo of the radar signal modulated by the particular pseudorandom waveform just transmitted is being received, it is (as usual) mixed down to an IF frequency, and input to a correlator. The IF signal has the form of a bipolar phase-shift keyed (BPSK) signal, as shown in FIG. 2, and has 180° phase transitions where the code waveform has transitions. Thus if the waveform received is an echo of the one transmitted, the correlator output would be an autocorrelation of the waveform and, in theory, be a signal as shown in FIG. 3a, while an actual test result is shown in FIG. 3b. All other waveforms received would yield a cross-correlation signal, whose maximum envelope amplitude would be less than that of the autocorrelation envelope, shown in FIG. 3a as unity for reference. The correlator's output is sampled and identified as a legitimate echo only if the envelope maximum exceeds a preselected minimum value above the prevailing background noise level (which is not shown in FIG. 3).

Figure 4:
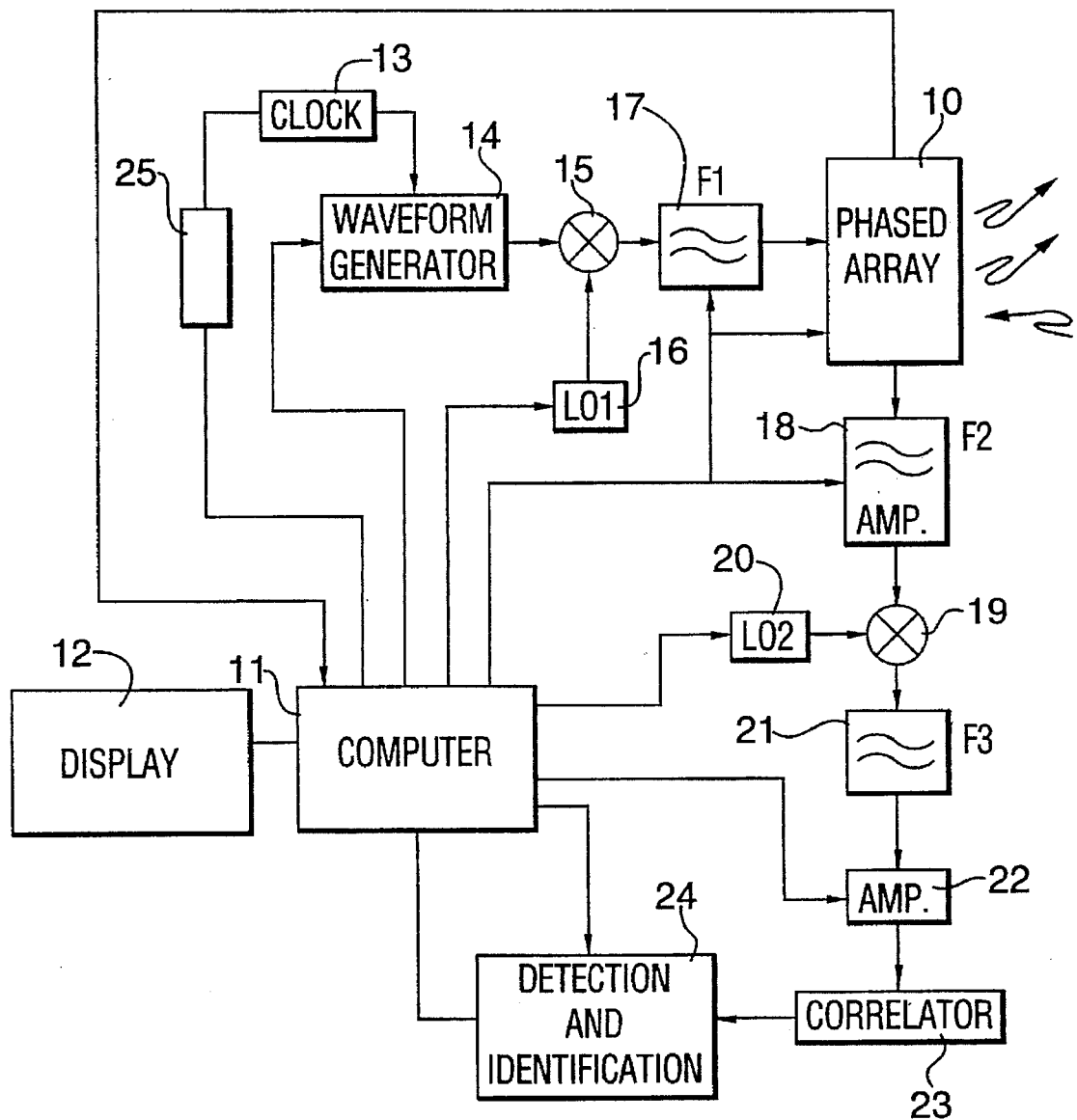
FIG. 4 is a block schematic of the radar system of the present invention.

FIG. 4 shows a block schematic of the radar system. It comprises a phased array antenna 10, a system computer 11, and a screen display 12. A clock 13 generates a clock frequency at 200 mHz (giving a chip-time of 5 nanoseconds), which clocks a waveform generator 14 (which is a bank of programmable shift registers) to produce a pseudorandom sequence, an example of which is shown in FIG. 1. The generation of pseudorandom sequences is well-known, and many millions of orthogonal waveforms can thus be produced.

The pseudorandom waveform generated is applied to a modulator 15 and modulates a carrier frequency generated by a local oscillator (LO1) 16. The output of the modulator 15 is band-pass filtered in filter (F1) 17 before being applied to the phased array 10. The returning (echo) waves, are superimposed on the non-compensated leakage from the transmitted waves, and are applied to band-pass filter (F2) and amplifier 18, the output of which is applied to mixer 19 and is heterodyned downward to the IF frequency by means of local oscillator (LO2) 20. The IF signal is band-pass filtered in filter (F3) 21 and applied to low noise amplifier 22 to compensate for the anticipated loss in correlator 23, the correlated output of which is applied to (sampling) detection and identification circuit 24, which is controlled by the computer 11. The latter computes the distances travelled by expected echoes and controls the display 12 to show the echo reflecting objects in real-time. The computer 11 also controls the incremental sweep of the narrow radar beam radiated by the phased array 10 within the desired horizontal angle, (more than one array may be used to cover 360°). Assuming a position of the phased array 10 antenna approximately 2 meters behind the front bumper of the vehicle, the distances measured w.r.t. the bumper range from −2 meters to a few hundred meters.

Figure 5:
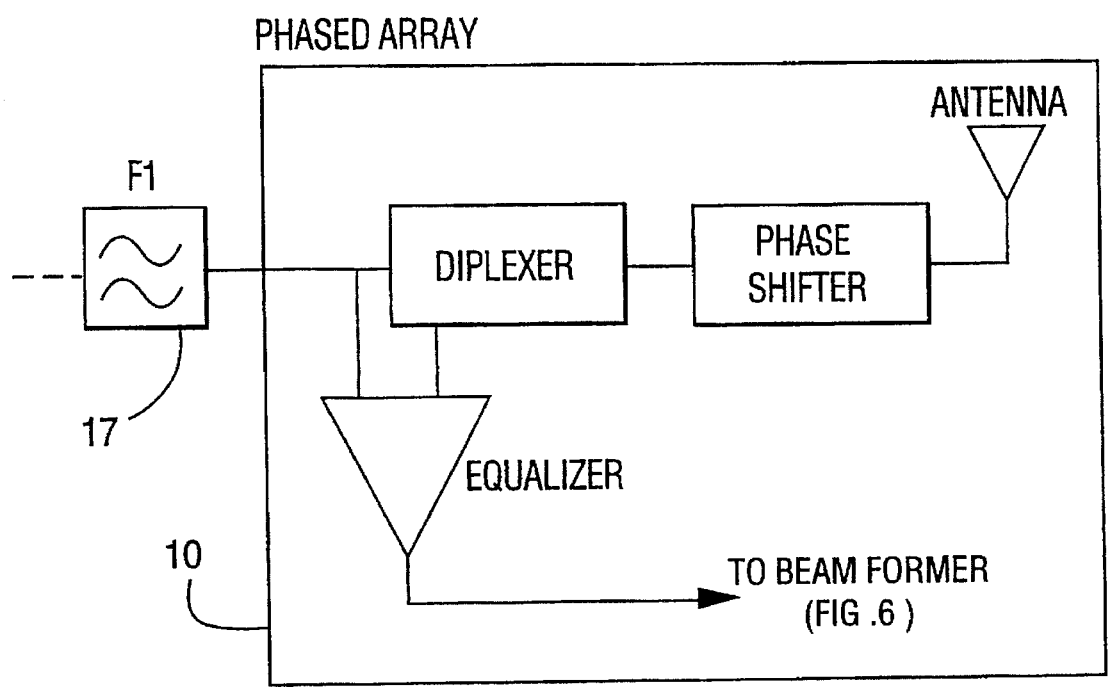
FIG. 5 is a schematic depicting use of an equalizer to compensate the leakage of the transmitted radar signal of the radar receiver.

The phased array 10 in FIG. 4 comprises, as is known in the art, the necessary dividers, diplexers, and phase-shifters, which are controlled by local microprocessors, in order to permit the efficient forming of the requisite very narrow beamwidth. But in addition, in order to reduce the leakage via the diplexers from transmitter to receiver below −30 dB, equalizers are used as shown in FIG. 5 within the phased array 10.

Figure 6:
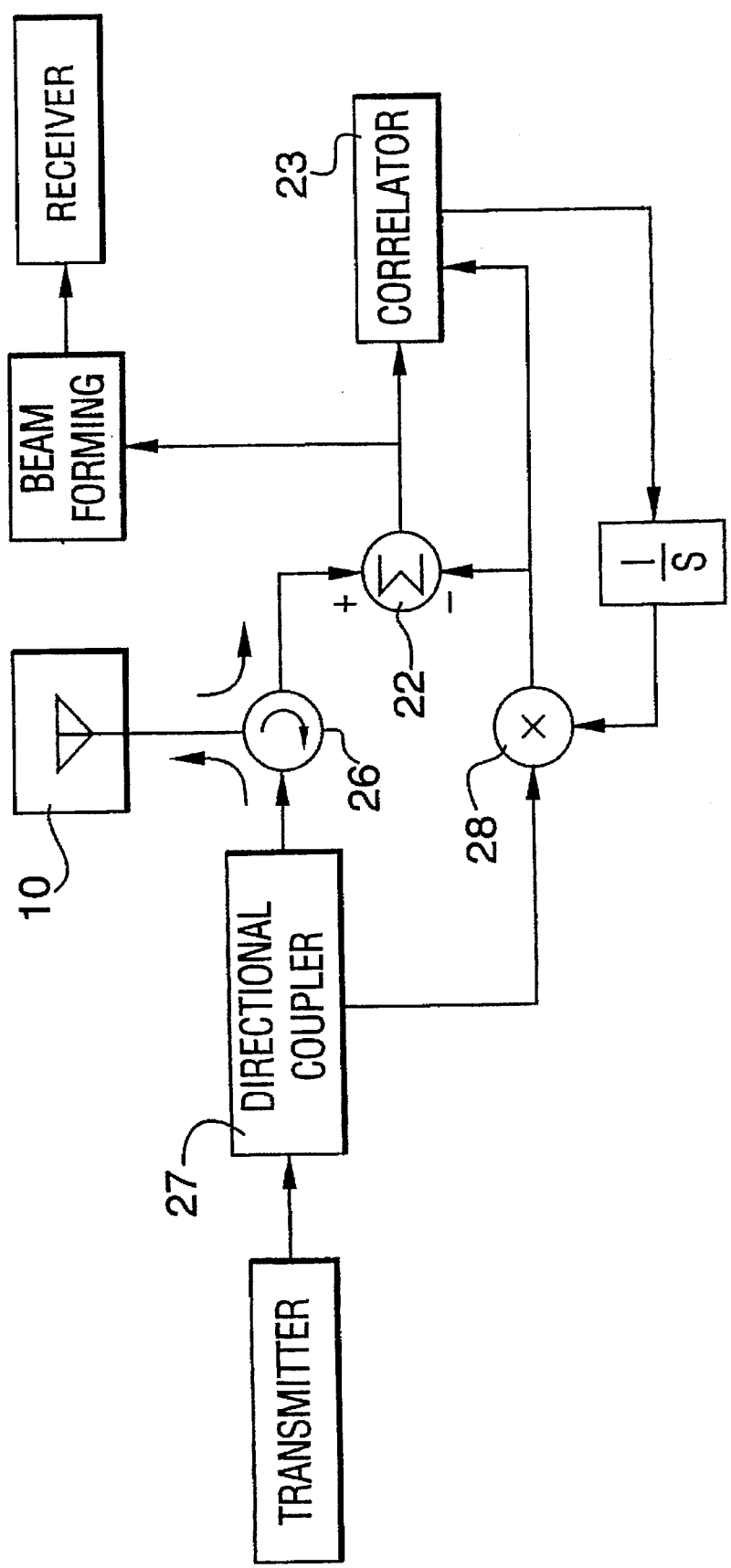
FIG. 6 is a schematic depicting a preferred arrangement for leakage compensation.
Figure 10:
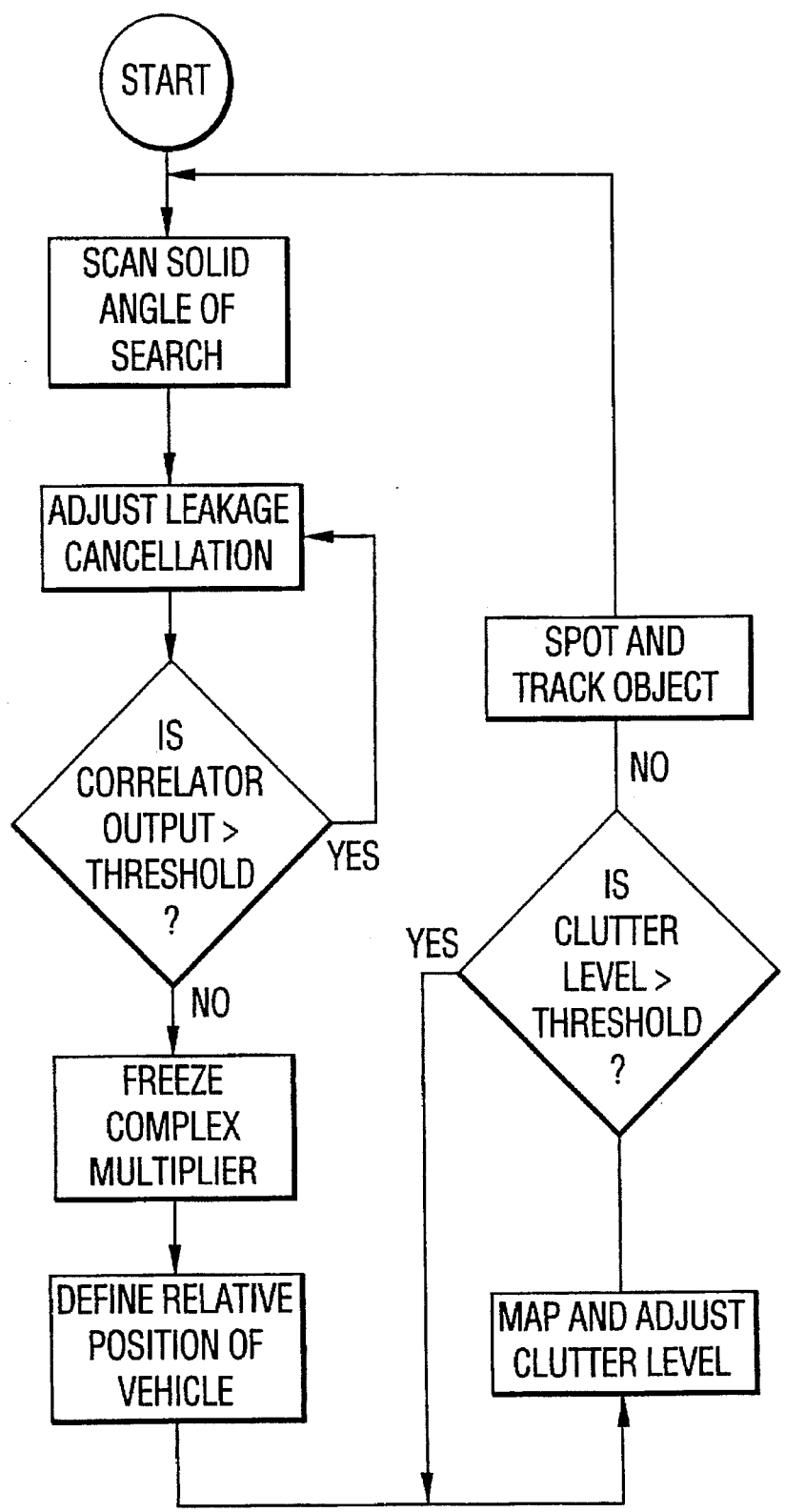
FIG. 10 is high-level flow chart illustrating operation of the radar system of the present invention.

In FIG. 6 is shown a preferred arrangement for compensating the leakage coupling from the transmit side to the receive side of a circulator 26 (diplexer). The transmit signal is applied to a directional coupler 27 before reaching the circulator 26 and a small amount of the transmit signal is tapped by the directional coupler 27 and applied to a complex multiplier 28, to the other input of which is applied the integrated (by 1/s block) output of the correlator 23. The output of the complex multiplier 28 is applied to the reference input of the correlator 23, as well as to the negative input of a summer 29, the positive input of which receives the radar echo as supplied by the circulator 26 (plus the leaked coupling from the transmit side). The output of the summer 29 is input to the correlator 23, which signal. The output of the summer 29 is also used in beam forming. Thus the transmit signal is tapped, and the level of the tapped signal 13 adjusted by means of the complex multiplier 28 under control of the computer 11 (once or twice per hour), and subtracted from the input to the summer 29 to cancel (in a least square error sense) the leakage through the circulator 26, which least square error cancellation is indicated when the correlator output falls below the set correlation detection threshold. The leakage coupling through the circulator 26, of course, adversely affects the signal-to-noise ratio (SNR), which is (at best) equal to the isolation of the circulator 26, when the echo experiences zero geometric attenuation (i.e. at zero distance). As is explained by the flow chart shown in FIG. 10, the system adaptively adjusts the leakage cancellation by means of the complex multiplier 28 until the output of the correlator 23 falls below threshold, at which point the multiplier 28 is frozen at its present setting. Thus the system is self-calibrating.

Figure 7:
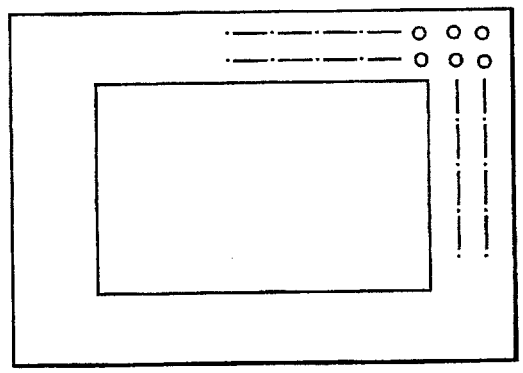
FIG. 7 is a front elevation illustrating use of a conformal phased array antenna at the (front) windshield of the vehicle in the present invention.

FIG. 7 shows the preferred phased array antenna, which is shaped as a rectangular border of dimensions equal to or greater than the windshield of the vehicle. The antenna pattern will depend on the frequency allocated. At 4 mm wavelength (75 GHz band), for example, the antenna will have a horizontal beamangle of no more than 10 mR (milli-radians), and a vertical beamangle of about 25 mR. This would permit sufficient resolution to distinguish a cyclist one meter removed beside a bus at a distance of over 50 meters ahead of the antenna.

Figure 8:
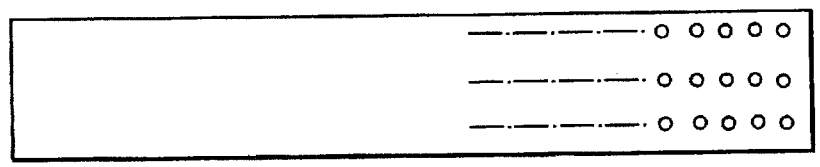
FIG. 8 is a front elevation illustrating use of a conformal phased array antenna at the rear of the vehicle in the present invention.

FIG. 8 shows a rear array which may be used passively to make an estimate (for example, using least square error methods) of distance and speed of an approaching, radar equipped, vehicle. The length of this lateral array would preferably be greater than 1.5 meters.

Figure 9:
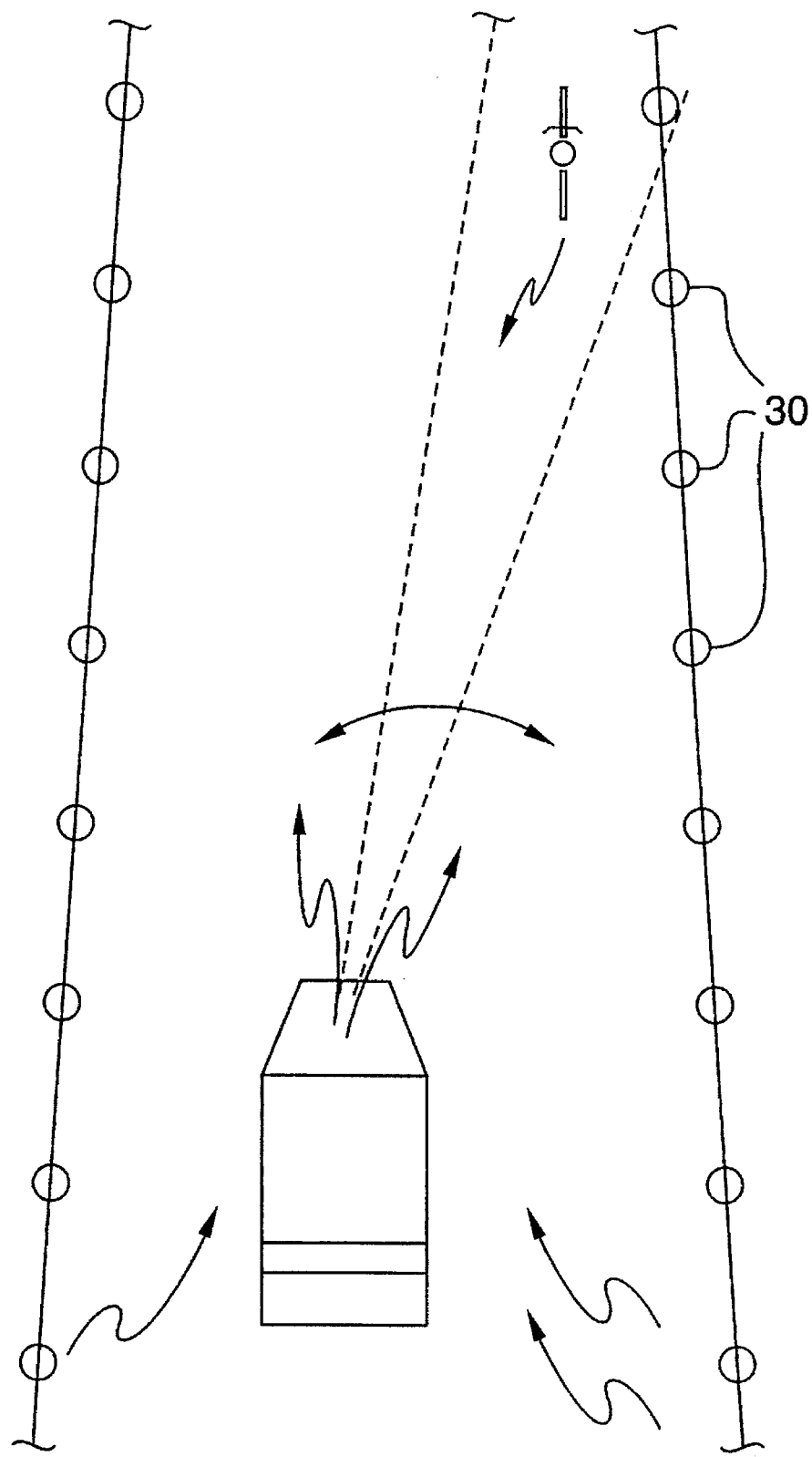
FIG. 9 depicts a plan view of a road equipped with demarcating Luneberg lenses to reflect radar signals.

FIG. 9 depicts a road equipped with Luneberg lenses 30, which are "tennis-ball" like objects mounted on guard-rail or road signs, marking its boundaries, which would appear as road boundaries on the display screen 12 positioned in front of the driver of the vehicle. The screen 12 may be built in the windshield of the vehicle as an LCD display screen.

What is claimed is:

1. A method for sensing mobile vehicles, comprising the steps of:

(a) transmitting by radar sequential pseudorandom code waveforms;

(b) tapping the pseudorandom code waveform transmitted in (a) and adjustably attenuating the tapped waveform to provide an attenuated version of the tapped waveform for cancellation of leakage of transmitted waveforms to a predetermined threshold;

(c) receiving echoes of the transmitted waveforms and subtracting therefrom the attenuated version of the pseudorandom code waveform obtained in step (b);

(d) correlating the attenuated versions of transmitted waveforms with waveforms resulting from subtraction in step (c); and (e) recognizing an echo only when an output of the correlation in step (d) exceeds the predetermined threshold.

2. The method as defined in claim 1, step (a) further comprising the step of generating a radar beam having a horizontal beamangle of a few milli-radians.

3. The method as defined in claim 2, step (a) further comprising the step of sweeping the radar beam across a horizontal angle at least a few times the horizontal beamangle.

4. A radar vision system for a mobile vehicle according to the method of claim 2 and comprising radar reflectors marking road boundaries, and the radar beam angle of the few milli-radians continuously sweeping horizontally in front of the vehicle, when moving, between the road boundaries.

5. The method as defined in claim 1, wherein said attenuated version of the pseudorandom code waveform is adjusted in level in response to the integrated output of the correlation in step (d).

6. The method as defined in claim 5, wherein said level is adjusted at least once per hour of operation.

7. The method as defined in claim 3, for providing radar-vision to operators of mobile vehicles.

8. A plurality of substantially interference-free radar systems, each comprising:

means for generating pseudorandom waveforms for sequential transmission by radar;

means for tapping the pseudorandom waveform generated and transmitted;

means for adjustably attenuating the tapped waveform to provide an attenuated version of the tapped waveform for cancellation of leakage of transmitted waveforms to a predetermined threshold;

means for correlating said adjustably attenuated versions of said pseudorandom waveforms with received echoes thereof wherein the adjustably attenuated versions are subtracted from said received echoes before correlation; and a radar transmitting and received phased array antenna having a horizontal beam angle of a few milli-radians.

* * * * *